United States Patent
Park et al.

(10) Patent No.: US 8,649,063 B2
(45) Date of Patent: *Feb. 11, 2014

(54) IMAGE FORMING APPARATUS AND METHOD THEREOF TO GENERATE A NEW IMAGE MODE BY COMBINING SELECTED IMAGE MODES

(71) Applicant: SAMSUNG Electronics Co., Ltd, Suwon-si (KR)

(72) Inventors: In-ho Park, Suwon-si (KR); Jung-ho Bang, Pocheon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/707,623

(22) Filed: Dec. 7, 2012

(65) Prior Publication Data

US 2013/0094062 A1    Apr. 18, 2013

Related U.S. Application Data

(63) Continuation of application No. 12/609,403, filed on Oct. 30, 2009, now Pat. No. 8,345,308.

(30) Foreign Application Priority Data

Dec. 11, 2008    (KR) .................. 10-2008-0125765

(51) Int. Cl.
   *H04N 1/40*    (2006.01)

(52) U.S. Cl.
   USPC ........... 358/3.23; 358/1.9; 358/1.1; 358/1.13; 382/162; 382/167; 382/274; 345/589; 345/581; 345/418; 345/619

(58) Field of Classification Search
   None
   See application file for complete search history.

(56) References Cited

U.S. PATENT DOCUMENTS

| 5,483,360 | A * | 1/1996 | Rolleston et al. | 358/518 |
| 5,606,432 | A * | 2/1997 | Ohtsuka et al. | 358/527 |
| 6,360,007 | B1 * | 3/2002 | Robinson et al. | 382/162 |

(Continued)

FOREIGN PATENT DOCUMENTS

| CN | 1599411 | 3/2005 |
| CN | 1855993 | 11/2006 |

(Continued)

OTHER PUBLICATIONS

Chinese Office Action dated Jun. 5, 2013 issued in CN Application No. 200910224798.7.

(Continued)

*Primary Examiner* — Paul F Payer
(74) *Attorney, Agent, or Firm* — Stanzione & Kim, LLP

(57) ABSTRACT

An image forming apparatus includes a user interface, and an image forming unit to perform an image forming job in a new image mode by combining two or more image modes when the two or more image modes are selected through the user interface. The image forming unit may include a controller to combine color lookup tables of the two or more selected image modes and to create a new color lookup table, and an engine unit to perform the image forming job in an image mode corresponding to the new color lookup table. Therefore, it is possible for the image forming apparatus to support various image modes.

25 Claims, 10 Drawing Sheets

(56) References Cited

U.S. PATENT DOCUMENTS

| | | | |
|---|---|---|---|
| 6,996,271 B2* | 2/2006 | Ono et al. | 382/167 |
| 7,245,306 B2 | 7/2007 | Yoshio et al. | |
| 7,298,522 B2* | 11/2007 | Sugimoto | 358/1.3 |
| 7,450,281 B2* | 11/2008 | Torigoe et al. | 358/523 |
| 7,688,332 B2 | 3/2010 | Yoshio et al. | |
| 7,710,596 B2* | 5/2010 | Shibao | 358/1.9 |
| 2003/0043392 A1 | 3/2003 | Sugimoto | |
| 2003/0156752 A1* | 8/2003 | Turpin et al. | 382/162 |
| 2004/0070619 A1 | 4/2004 | Yoshio et al. | |
| 2005/0062779 A1 | 3/2005 | Mimamino | |
| 2006/0119874 A1* | 6/2006 | Kurihara | 358/1.13 |
| 2006/0221397 A1 | 10/2006 | Chung | |
| 2007/0222789 A1 | 9/2007 | Yoshio et al. | |

FOREIGN PATENT DOCUMENTS

| | | |
|---|---|---|
| CN | 101093439 | 12/2007 |
| CN | 101146172 | 3/2008 |
| EP | 0687103 | 12/1995 |
| JP | 08-002012 | 1/1996 |
| JP | 2003-076097 | 3/2003 |
| JP | 2003-324617 | 11/2003 |

OTHER PUBLICATIONS

Korean Office Action dated Dec. 23, 2013 issued in KR Application No. 10-2008-0125795.

* cited by examiner

IMAGE FORMING APPARATUS AND METHOD THEREOF TO GENERATE A NEW IMAGE MODE BY COMBINING SELECTED IMAGE MODES

CROSS-REFERENCE TO RELATED APPLICATIONS

This application is a Continuation Application of prior application Ser. No. 12/609,403, filed on Oct. 30, 2009 in the United States Patent and Trademark Office, which claims the benefit under 35 U.S.C. §119 (a) from Korean Patent Application No. 10-2008-0125765, filed on Dec. 11, 2008, in the Korean Intellectual Property Office, the disclosure of which is incorporated herein by reference in its entirety.

BACKGROUND

1. Field of the Invention

The present general inventive concept relates to an image forming apparatus and method thereof. More particularly, the present general inventive concept relates to an image forming apparatus capable of combining a plurality of image modes and performing an image forming job, and an image forming method thereof.

2. Description of the Related Art

Various image forming apparatuses have been developed, and their use is widespread as evidenced by development of electronic technologies. Image forming apparatuses form text or images on sheets of paper or other recording media, and include, for example printers, copiers, scanners, facsimile machines or multifunction peripherals (MFPs).

Recently, image forming apparatuses have come to provide users with various functions to meet a variety of user requirements. Additionally, image forming apparatuses are able to process various types of documents. In other words, users are increasingly trying to perform image forming jobs using not only general text documents but also photographs, maps or magazines.

Accordingly, image forming apparatuses need to be able to support a plurality of image modes to appropriately process various types of documents. For example, if a user desires to print a photograph, he or she may select a photo mode so that the photograph may be printed using color values optimized for printing of photographs.

However, it is difficult to support all image modes available for all kinds of documents due to lack of storage space in image forming apparatuses. Therefore, image forming apparatuses do not adequately meet user's needs and desires.

SUMMARY

The present general inventive concept provides an image forming apparatus capable of combining one or more image modes among a plurality of image modes capable of being supported by the image forming apparatus, and capable of processing an image forming job in a new image mode, and an image forming method of the image forming apparatus.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing an image forming apparatus including a user interface, and an image forming unit to perform an image forming job in a new image mode by combining two or more image modes when the two or more image modes are selected through the user interface.

The image forming apparatus may further include a storage unit to store information regarding a plurality of image modes and a plurality of color lookup tables respectively set for the plurality of image modes.

The image forming unit may include a controller to combine color lookup tables of the two or more selected image modes and to create a new color lookup table, and an engine unit to perform the image forming job in an image mode corresponding to the new color lookup table created by the controller.

When the two or more image modes are selected, the user interface may arrange a plurality of color areas constituting the color lookup tables of the two or more selected image modes, and may display a ratio adjustment field to set combination ratios of the two or more selected image modes in each of the plurality of color areas.

The ratio adjustment field may include a plurality of connection lines to connect the two or more selected image modes for each color area, and a plurality of gauges to move on the plurality of connection lines according to user control.

One image mode among the two or more selected image modes may be matched to one end of each of the plurality of the connection line, and another image mode may be matched to the opposite end. A combination ratio of the two image modes matched to both ends of each of the connection lines may be set according to a distance ratio between each of the plurality of gauges and both ends.

The storage unit may match information regarding the new image mode to information regarding the new color lookup table and may store the matched information.

The user interface may display a list of the plurality of image modes stored in the storage unit so that the plurality of image modes may be selected from the list.

When a custom color mode is selected, the controller may combine a default mode to use a color lookup table representing basic colors and the custom color mode to use a color lookup table in which a specific custom color is emphasized.

The user interface may display a selection field through which each of the plurality of color areas is capable of being selected. In this situation, the controller may combine data on one or more color areas selected through the selection field from data on the color lookup tables of the two or more selected image modes, and may create the new color lookup table.

The image forming unit may further include a ratio setting unit to automatically set a combination ratio of the color lookup tables of the two or more selected image modes and to provide the set combination ratio to the controller.

The ratio setting unit may automatically set a combination ratio of gray area data in each of the color lookup tables of the two or more selected image modes according to a ratio of a gray value to a color value of an object for the image forming job.

The user interface may display a preview image for the new image mode.

The foregoing and/or other aspects and utilities of the present general inventive concept may also be achieved by providing an method to form an image on an image forming apparatus, including receiving a selection of two or more image modes, and performing an image forming job in a new image mode by combining the two or more selected image modes.

The performing of the image forming job may include combining color lookup tables of the two or more selected image modes and creating a new color lookup table, and performing the image forming job in an image mode corresponding to the new color lookup table.

The method may further include, when the two or more image modes are selected, displaying a plurality of color areas constituting the color lookup tables of the two or more selected image modes, and a screen comprising a ratio adjustment field to set combination ratios of the two or more selected image modes in each of the plurality of color areas.

The ratio adjustment field may include a plurality of connection lines to connect the two or more selected image modes for each color area, and a plurality of gauges to move on the plurality of connection lines according to user control.

One image mode among the two or more selected image modes may be matched to one end of each of the plurality of the connection line, and another image mode may be matched to the opposite end. A combination ratio of the two image modes matched to both ends of each of the connection lines may be set according to a distance ratio between each of the plurality of gauges and both ends.

The method may further include matching information regarding the new image mode to information regarding the new color lookup table and storing the matched information.

The method may further include displaying a list of the plurality of pre-stored image modes so that the plurality of image modes are selected from the list.

The method may further include, when a custom color mode is selected, combining a default mode to use a color lookup table representing basic colors and the custom color mode to use a color lookup table in which a specific custom color is emphasized.

The screen may include a selection field through which each of the plurality of color areas is capable of being selected.

The creating of the new color lookup table may include combining data on one or more color areas selected through the selection field from data on the color lookup tables of the two or more selected image modes, and creating the new color lookup table.

The creating of the new color lookup table may include automatically setting a combination ratio of the color lookup tables of the two or more selected image modes and combining the color lookup tables at the set combination ratio.

The creating of the new color lookup table may include automatically setting a combination ratio of gray area data in each of the color lookup tables of the two or more selected image modes according to a ratio of a gray value to a color value of an object for the image forming job.

The method may further include displaying a preview image for the new image mode.

As described above, it is possible to support various image modes satisfying user's requirements although not all color lookup tables may be set for the various image modes.

The foregoing and/or other aspects and utilities of the present general inventive concept may be also achieved by providing a computer readable medium to a program to perform a method to form an image in an image forming apparatus, the method including receiving a selection of two or more image modes, and performing an image forming job in a new image mode by combining the two or more selected image modes.

The foregoing and/or other aspects and utilities of the present general inventive concept may be also achieved by providing an image forming apparatus including a storage unit to store a plurality of image modes, and a controller to combine at least two of the stored image modes and to perform a print forming job.

The stored image modes may include color components having different values.

The combined image mode may be different from the stored image modes.

BRIEF DESCRIPTION OF THE DRAWINGS

These and/or other features and advantages of the present general inventive concept will become apparent and more readily appreciated from the following description of the embodiments, taken in conjunction with the accompanying drawings of which.

DETAILED DESCRIPTION OF THE EMBODIMENTS

Figure 1:
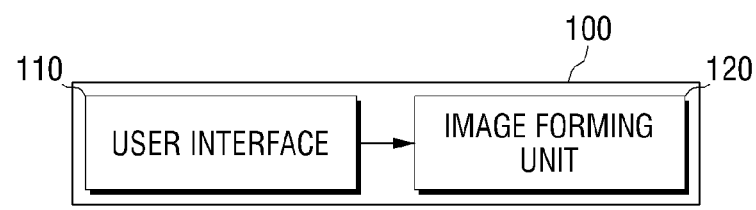
FIG. 1 illustrates a block diagram of an image forming apparatus according to an exemplary embodiment of the present general inventive concept.

Reference will now be made in detail to various exemplary embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 illustrates a block diagram of an image forming apparatus 100 according to an exemplary embodiment of the present general inventive concept. The image forming apparatus 100 of FIG. 1 includes a user interface 110 and an image forming unit 120. The image forming apparatus 100 may be implemented as a printer, a copier, a multifunction peripheral (MFP), a scanner, a facsimile machine or another imaging device.

The user interface 110 may receive various commands from a user to control the image forming apparatus 100, or may display various messages to support interfacing with the user.

The image forming unit 120 may perform an image forming job according to commands received via the user interface unit 110. In more detail, when a user selects a plurality of image modes with respect to at least one image to be printed on a print medium, the image forming unit 120 may perform an image forming job to print the image on a print medium according to the command in a new image mode created by combining the plurality of selected image modes. The image modes may be input through the user interface 110. The user interface 110 may include a screen monitor to display a screen and a keyboard to enter data corresponding to the image modes. The screen monitor and keyboard may be a single touchscreen to display the screen and to enter the data.

A user may select two or more modes from among a plurality of image modes capable of being supported by the image forming apparatus 100, using the user interface 110. Herein, the plurality of image modes may include a text mode, a photo mode, a mixed mode, a magazine mode, a map mode, a saturation mode, a custom color mode or the like. The different image modes may include settings for monochromatic color or grayscale color, saturation and brightness, and other image parameters.

Figure 2:
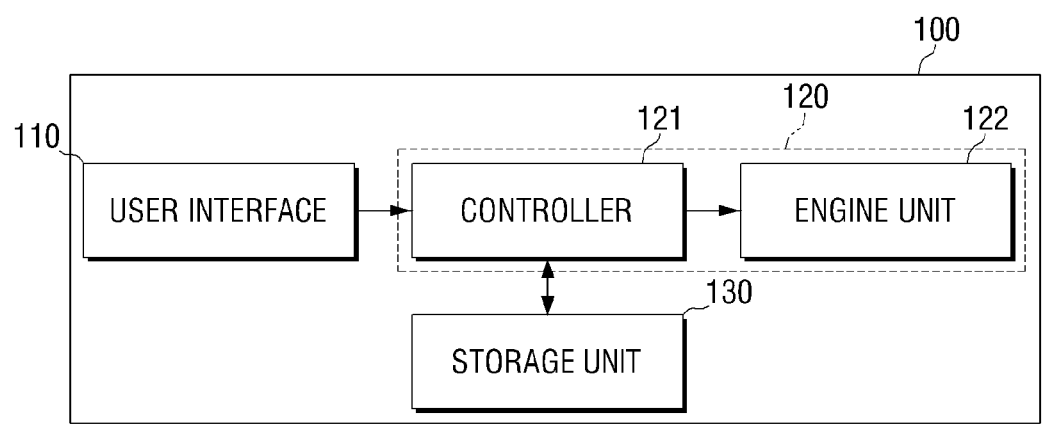
FIG. 2 illustrates a detailed block diagram of an image forming apparatus according to an exemplary embodiment of the present general inventive concept.

FIG. 2 illustrates a detailed block diagram of the image forming apparatus 100 of FIG. 1. The image forming apparatus 100 may further include a storage unit 130. The image forming unit 120 may include a controller 121 and an engine unit 122.

The storage unit 130 stores information regarding the plurality of image modes capable of being supported by the image forming apparatus 100, and a plurality of color lookup tables respectively set for the plurality of image modes. Each of the plurality of color lookup tables may include values obtained by setting and recording optimum color attributes suitable for each of the plurality of image modes through repeated evaluations during manufacturing of the image forming apparatus 100.

The user may select two or more modes from among the plurality of image modes stored in the storage unit 130, using the user interface 110, in a custom mode. The custom mode enables an image forming job to be performed in a new image mode created by combining the two or more modes selected by the user. In a normal image mode, a user directly selects a desired image mode so that the image forming job may be performed using a color lookup table set for the selected image mode. In a custom image mode, if there is no image mode which the user desires to select, the user may select the custom mode. In the custom mode, the user interface 110 may enable the user to select one or mode image modes.

Alternatively, the user may select another image mode within a predetermined time after selecting one image mode even when the custom mode is not provided by the image forming apparatus 100. In this situation, the image forming apparatus 100 may recognize the user selection as a command to combine the selected image modes. The user may select two image modes simultaneously, and the image forming apparatus 100 may recognize the user selection as a command to combine the selected image modes.

The controller 121 combines two or more color lookup tables set for the two or more image modes selected by the user to create a new color lookup table. Each of the two or more color lookup tables may include data classified into a plurality of color areas. For example, a color lookup table may include gray, red, green, blue, cyan, magenta or yellow color areas.

A color lookup table refers to a table in which input red (R), green (G), and blue (B) data is mapped to output cyan (C), magenta (M), yellow (Y), and black (K) data, and may be represented by the following Equation 1.

$C = \text{Color\_LUT}[R][G][B][0]$ $M = \text{Color\_LUT}[R][G][B][1]$ $Y = \text{Color\_LUT}[R][G][B][2]$ $K = \text{Color\_LUT}[R][G][B][3]$ [Equation 1]

In Equation 1, R, G, B indicate lattice points, and may be illustrated in the following Table 1.

TABLE 1

| R | G | B |
|---|---|---|
| 0 | 0 | 0 |
| 0 | 0 | 16 |
| 0 | 16 | 0 |
| 0 | 16 | 16 |
| 16 | 0 | 0 |
| ... | ... | ... |
| 255 | 255 | 240 |
| 255 | 255 | 255 |

In Table 1, the color lookup table may be set so that each of input R, G, B data may be represented with 256 levels for every 16 point.

The engine unit 122 may perform the image forming job in an image mode corresponding to the color lookup table created by the controller 121. In more detail, the engine unit 122 may search for color attributes of each pixel of an object, namely values of output C, M, Y, K data (namely, Color_LUT[R][G][B][0], Color_LUT[R][G][B][1], Color_LUT[R][G][B][2], Color_LUT[R][G][B][3]) matched to values of input R, G, B data from the color lookup table, and may convert the values of input R, G, B data into the values of output C, M, Y, K data, so as to form an image of the object. If there is no match between the values of input R, G, B data and the values of output C, M, Y, K data, one of the values of input R, G, B data from the color lookup table close to the value of output C, M, Y, K data may be selected.

The engine unit 122 may include various elements according to the type of image forming apparatus. For example, in the case of a laser printer, the engine unit 122 may include a video controller or engine controller, a developing unit, a charging unit, a laser scanning unit, a transferring unit, a fusing unit or other units. Alternatively, in the case of a copy machine, the engine unit 122 may include both a printing unit and a scanning unit. Accordingly, the configuration of the engine unit 122 may be determined according to the type of apparatus to which the present general inventive concept is applicable, and the above-described elements of the engine unit 122 have conventionally been known, so no further description thereof is herein provided.

Figure 3:
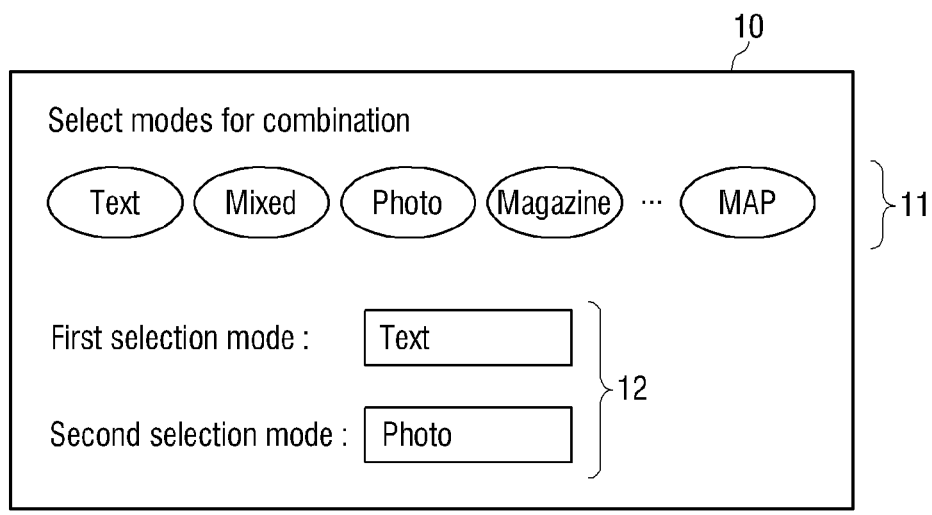
FIG. 3 exemplarily illustrates a screen displayed on an image forming apparatus according to an exemplary embodiment of the present general inventive concept.

FIG. 3 exemplarily illustrates a screen 10 provided by the user interface 110 of the image forming apparatus 100. In FIG. 3, the screen 10 displays information regarding the plurality of image modes 11 supported by the image forming apparatus 100, so the user may select two or more image modes 12 which he or she desires to combine by touching the screen 10 or by pressing keys on the image forming apparatus 100. The image modes selected by the user 12 may be displayed on one side of the screen 10. Although the screen 10 of FIG. 3 displays two image modes selected by the user 12, there is no necessary limitation thereto. The screen 10 may be configured to display additional selection modes, and three or more modes may be selected by the user. Additionally, there is no need to display the selected image modes 12 on one side of the screen 10, and accordingly the present general inventive concept is also applicable to a situation in which colors or shapes of icons indicating the selected image modes are changed so that a user is notified that the selection of image modes is completed.

While the text mode, photo mode, mixed mode, magazine mode, map mode or the like 11 are displayed on the screen 10 as illustrated in FIG. 3, various modes other than the modes appearing on the screen 10 may also be added, for example a saturation mode or a custom color mode. Additionally, part of the modes appearing on the screen 10 may be deleted.

A combination ratio of the selected image modes may be set automatically or manually and is described hereinbelow.

Figure 4:
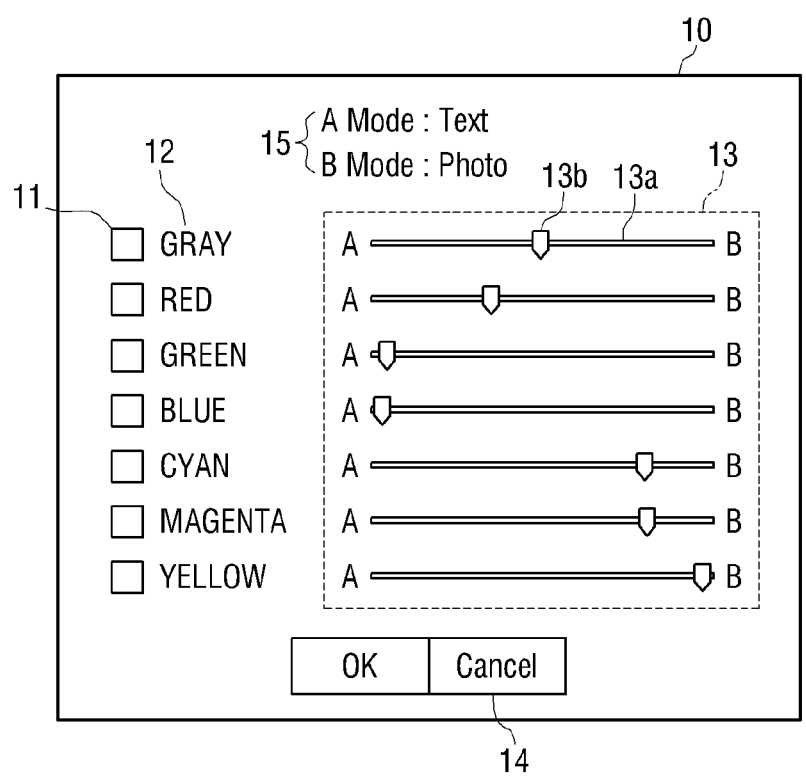
FIG. 4 illustrates an example of a screen to set a combination ratio of image modes.

FIG. 4 exemplarily illustrates a screen 10 displayed when a user manually enters a combination ratio. In FIG. 4, the screen 10 displays a selection field 11, a color area display field 12, a ratio adjustment field 13, a command field 14, and a selected mode display field 15. In this situation, the screen 10 of FIG. 4 may be provided by the user interface 110, and a text mode and photo mode are selected.

The color area display field 12 displays information regarding each color area of a color lookup table. For example, if a color lookup table contains gray data, red data, green data, blue data, cyan data, magenta data and yellow data, information on seven color areas is arranged in color area display field 12, as illustrated in FIG. 4.

The selection field 11 enables a user to select two or more color areas which he or she desires to combine from among the seven color areas on the color area display field 12. For example, the user may select a gray area and blue area by touching areas of the color area display field 12 or areas of the selection field 11 which correspond to the gray and blue, or by moving a cursor or pressing a key.

After selecting the two or more color areas, the user may manually set a combination ratio of the two selected image modes through the ratio adjustment field 13. The ratio adjustment field 13 may include a plurality of connection lines 13a for connection between the two selected image modes for each color, and a plurality of gauges 13b capable of moving on the plurality of connection lines 13a according to user manipulation.

Each of the plurality of gauges 13b moves along each of the plurality of connection lines 13a according to the user manipulation. One end of each of the plurality of the connection line 13a is matched to one image mode, and the opposite end is matched to the other image mode. In this situation, the combination ratio may be set according to the distance ratio between each of the gauges 13b and both ends of each of the connection lines 13a. For example, if the gauge 13b moves to the leftmost on the connection line 13a, the controller 121 may apply only color area data in A mode (namely, the text mode) to create a new color lookup table. Alternatively, if the gauge 13b moves to the rightmost on the connection line 13a, the controller 121 may apply only color area data in B mode (namely, the photo mode) to create a new color lookup table.

If the gauge 13b is placed between both ends of the connection line 13a rather than at both ends, the controller 121 may combine the color area data in A mode with the color area data in B mode with a combination ratio corresponding to the position of the gauge 13b, to create a new color lookup table.

In this situation, the controller 121 may create a new color lookup table using the following Equation 2.

custom_$C$=A_Color_LUT[$R$][$G$][$B$][0]*MP+B_Color_LUT[$R$][$G$][$B$][0]*(1-MP)

custom_$M$=A_Color_LUT[$R$][$G$][$B$][1]*MP+B_Color_LUT[$R$][$G$][$B$][1]*(1-MP)

custom_$Y$=A_Color_LUT[$R$][$G$][$B$][2]*MP+B_Color_LUT[$R$][$G$][$B$][2]*(1-MP)

custom_$K$=A_Color_LUT[$R$][$G$][$B$][3]*MP+B_Color_LUT[$R$][$G$][$B$][3]*(1-MP)  [Equation 2]

In Equation 2, custom_C, custom_M, custom_Y, custom_K indicate output C, M, Y, K data of the new color lookup table, respectively; A_Color_LUT[R][G][B][0], A_Color_LUT[R][G][B][1], A_Color_LUT[R][G][B][2], A_Color_LUT[R][G][B][3] indicate output C, M, Y, K data corresponding to input R, G, B data in a color lookup table of A mode, respectively; and B_Color_LUT[R][G][B][0], B_Color_LUT[R][G][B][1], B_Color_LUT[R][G][B][2], B_Color_LUT[R][G][B][3] indicate output C, M, Y, K data corresponding to input R, G, B data in a color lookup table of B mode. Additionally, MP indicates a mixing parameter. A mixing parameter refers to a ratio of a distance between the gauge 13b and the rightmost end of the connection line 13a to the total distance of the connection line 13a, when the total distance of the connection line 13a is set to be 1 and values of the leftmost end and rightmost end of the connection line 13a are set to be 1 and 0, respectively. In this situation, the mixing parameter represents a real number in the range of 0 to 1.0. For example, if the gauge 13b is placed on the center of the connection line 13a, a value of the mixing parameter may be 0.5.

Mixing parameters for non-selected color areas may be set to be 0 or 1. In other words, the mixing parameters may be set so that color area data in a default mode, namely A mode or B mode, may be used. The mixing parameters described above correspond to the combination ratio described above and below.

Although each of the plurality of connection lines 13a of FIG. 4 has a shape of a straight line graph, there is no limitation to the straight line graph. Accordingly, each of the plurality of connection lines 13a may be represented in the form of a circular graph or a fan-shaped graph. Additionally, there is no need to display the ratio adjustment field 13 with the connection lines 13a and the gauges 13b, and accordingly it is possible to display the ratio adjustment field 13 through which a user may enter the combination ratio of the selected color areas using numerical or percentage values.

After setting the combination ratio, the user may press an 'OK' button on the command field 14, to input a mode combination command.

Figure 5:
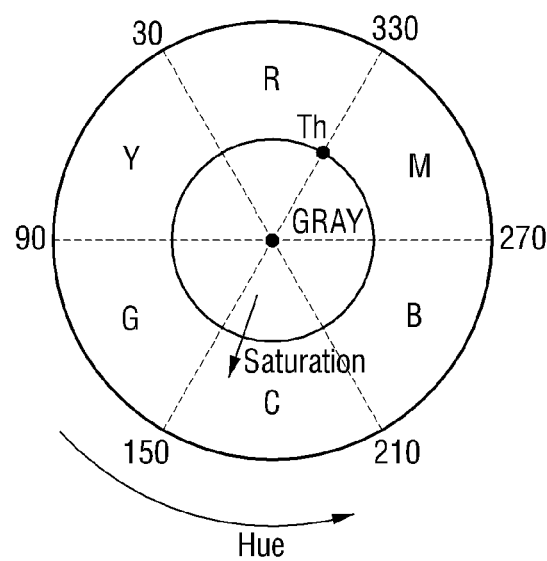
FIG. 5 exemplarily illustrates a configuration of color areas of a color lookup table.

FIG. 5 exemplarily illustrates a configuration of color areas of a color lookup table. In the graph of FIG. 5, a hue may be determined according to the angle of counterclockwise rotation from a line (namely, a base line) connecting the origin to the northernmost, and a saturation may be determined according to the distance from the origin.

Accordingly, colors may be determined according to the hue angle. Referring to FIG. 5, a hue angle of an R area is set to be equal to or greater than 330° and to be less than 30°; a hue angle of a Y area is set to be equal to or greater than 30° and to be less than 90°; a hue angle of a G area is set to be equal to or greater than 90° and to be less than 150°; a hue angle of a C area is set to be equal to or greater than 150° and to be less than 210°; a hue angle of a B area is set to be equal to or greater than 210° and to be less than 270°; and a hue angle of an M area is set to be equal to or greater than 270° and to be less than 330°. Although the six color areas are identical in dimension as illustrated in FIG. 5, there is no limitation thereto. Accordingly, the present general inventive concept is also applicable to a situation in which the six color areas have different dimensions. Similarly, while six color areas are shown in FIG. 5, other numbers of color areas may be shown, such as three or four color areas or other numbers.

Additionally, an area in the range in which the distance from the origin is equal to or less than threshold Th may be set to a gray area. In this situation, the distance from the origin may be set to be in the range of 0 to 1.0, and the threshold Th may be set to be about 0.3. However, these numerical values may be changed according to the individual physical characteristics of the image forming apparatuses.

Figure 6:
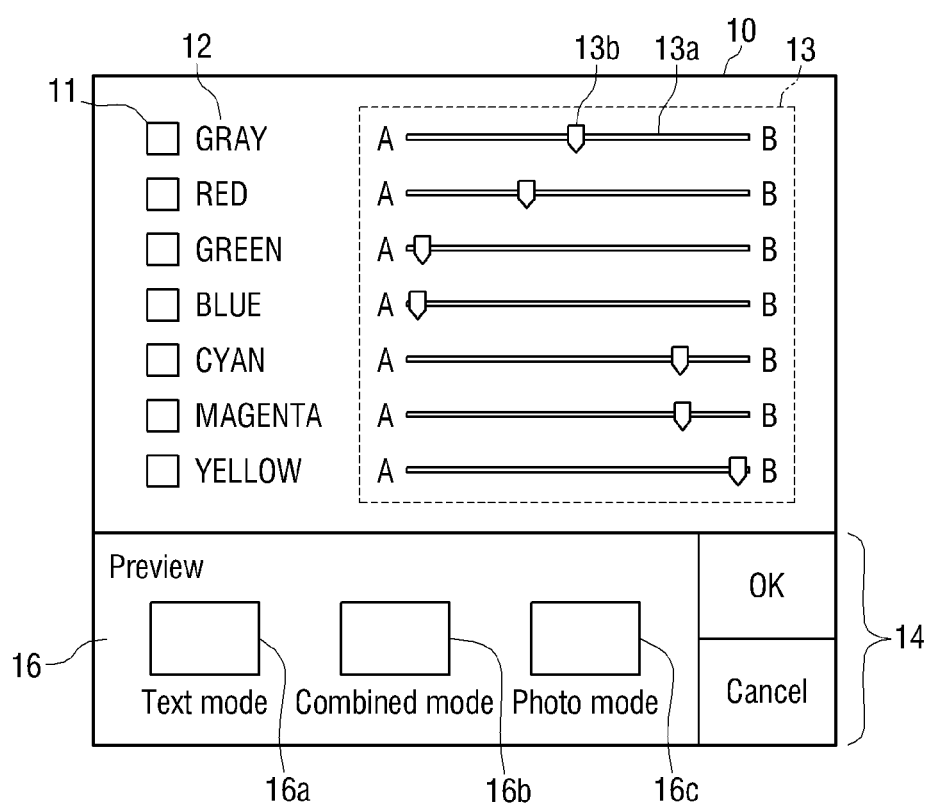
FIG. 6 illustrates another example of a screen to set a combination ratio of image modes.

FIG. 6 illustrates another example of a screen 10 provided by the user interface 110 of the image forming apparatus 100. In FIG. 6, the screen 10 displays a preview field 16 on one side thereof. The preview field 16 may display preview images 16a and 16c to show two image modes selected by the user, and a preview image 16b to show a new image mode. Additionally, if an additional image mode is also selected, then an additional preview image may be displayed. In other words, the preview field 16 may enable a user to preview on the screen 10 an image to be printed when different color lookup tables are applied to the same image. In this situation, each of the preview images may be an image to be formed, for example a document to be copied or a document to be printed, or may be a scanned image. However, there is no limitation to such images, and accordingly a default image that has been stored in the image forming apparatus 100 may be used as a preview image.

When the user adjusts the combination ratio through the ratio adjustment field 13 on the screen 10 of FIG. 6, changes according to the adjustment of the combination ratio may be immediately reflected on the preview image 16b. Therefore, it is possible for the user to create a desired optimum image mode conveniently.

Figure 7:
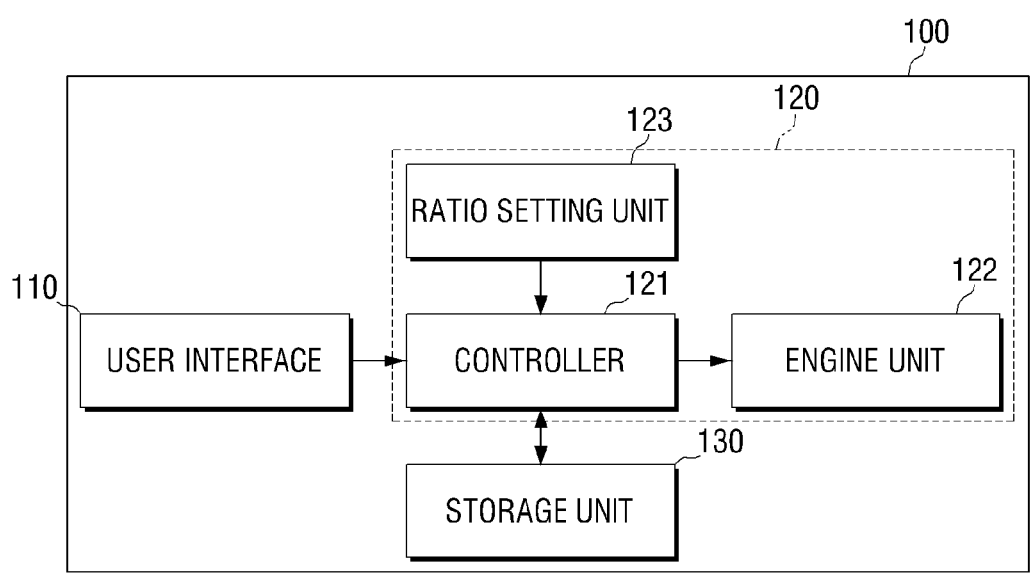
FIG. 7 illustrates a block diagram of an image forming apparatus according to another exemplary embodiment of the present general inventive concept.

FIG. 7 illustrates a block diagram of an image forming apparatus 100 according to another exemplary embodiment of the present general inventive concept. The image forming apparatus 100 of FIG. 7 includes a user interface 110, an image forming unit 120 and a storage unit 130. The image forming unit 120 includes a controller 121, an engine unit 122 and a ratio setting unit 123.

The ratio setting unit 123 may automatically set a combination ratio of two or more image modes which a user desires to combine. The set combination ratio may be transferred to the controller 121, so that the controller 121 may create a color lookup table of a new image mode, and may control the engine unit 122 to perform an image forming job based on the created color lookup table.

Additionally, the ratio setting unit 123 may determine whether an object is a monochromatic document or a color document, using an auto color selection (ACS) function. In more detail, the ratio setting unit 123 may check a ratio of a gray value of the object to a color value of the object, and may then determine the object to be a monochromatic document upon determining that the gray value of the object is equal to or greater than a threshold, or determine the object to be a color document upon determining that the gray value of the object is less than the threshold.

The ratio setting unit 123 may also set a combination ratio of gray area data in each color lookup table set for each of the selected image modes automatically according to the ratio of the gray value to the color value of the object. Herein, the object may be a scanned document for copying when the image forming apparatus 100 is a copier; or may be document data to be printed when the image forming apparatus 100 is a printer; or may be data obtained by scanning a document to be transmitted or may be received document data when the image forming apparatus 100 is a facsimile machine.

The ratio setting unit 123 may analyze histogram properties for the object, and may check saturation values, to compute the ratio of the gray value to the color value of the object.

Figure 8:
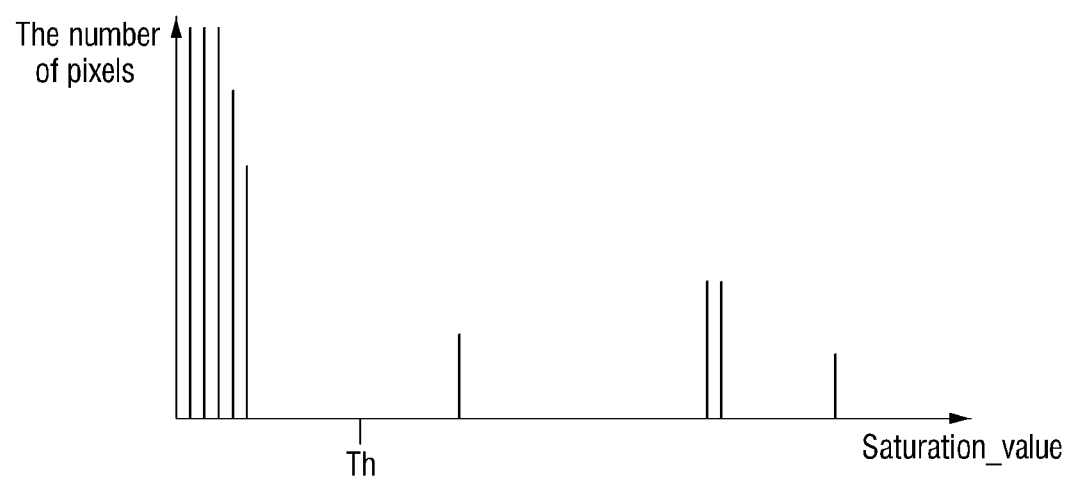
FIG. 8 exemplarily illustrates histogram properties for an object.

FIG. 8 exemplarily illustrates histogram properties for the object. When the number of pixels having saturation values within a predetermined range (namely, in the range of 0 to Th) is excessively large as illustrated in FIG. 8, the object is determined to be a monochromic document. The ratio setting unit 123 may set the mixing parameter, namely the combination ratio, using the following Equation 3.

$$MP = \frac{(1 - \text{Saturation value}) * (pixel_{TH})}{\text{total pixel}} \quad [\text{Equation 3}]$$

In Equation 3, the total pixel indicates the total number of pixels; $pixel_{TH}$ indicates the number of pixels having saturation values equal to or less than threshold Th; and the saturation value indicates a value representative of saturation values of pixels which are equal to or less than threshold Th. In other words, the saturation value may represent an average of saturation values or a saturation value of the greatest number of pixels.

For example, assuming that threshold Th is 0.3 and the maximum saturation value is 1, if the total number of pixels is 100, the number of pixels having saturation values equal to or less than 0.3 is 80 and the saturation value is 0.2, the ratio setting unit 123 may obtain a mixing parameter of 0.64 using the Equation 3.

When A mode is set to a text mode and B mode is set to a default mode, the controller 121 may combine two color lookup tables using a mixing parameter of 0.64 through Equation 2. In this situation, since the user selects a combination ratio automatic setting mode, A mode is set to a text mode and B mode is set to a default mode. The default mode refers to a mode in which the gray area data has been set in order to set the combination ratio.

Therefore, the combination ratio may be automatically set.

Figure 9:
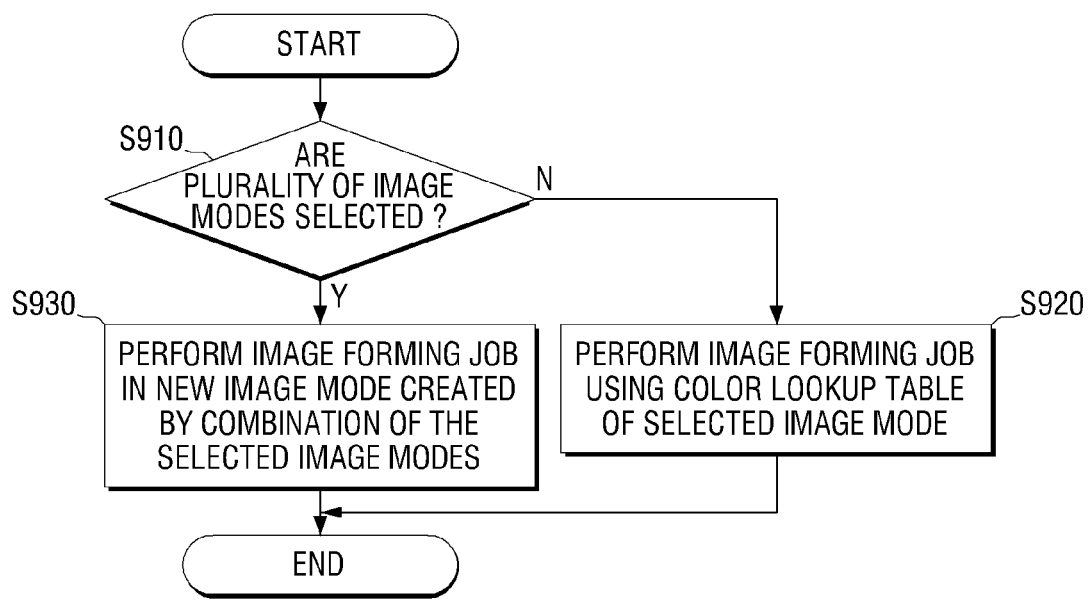
FIG. 9 is flowchart explaining an image forming method according to an exemplary embodiment of the present general inventive concept.

FIG. 9 is flowchart explaining an image forming method according to an exemplary embodiment of the present general inventive concept.

In FIG. 9, if a single image mode is selected in operation S910: N, an image forming job is performed using only a color lookup table of the selected image mode in operation S920.

Alternatively, if a plurality of image modes are selected in operation S910: Y, an image forming job is performed in a new image mode created using a combination of the plurality of selected image modes in operation S930. In this situation, the new image mode may refer to a mode to form an image based on a new color lookup table obtained by combining a plurality of color lookup tables respectively set for the plurality of selected image modes using the above-described method.

Figure 10:
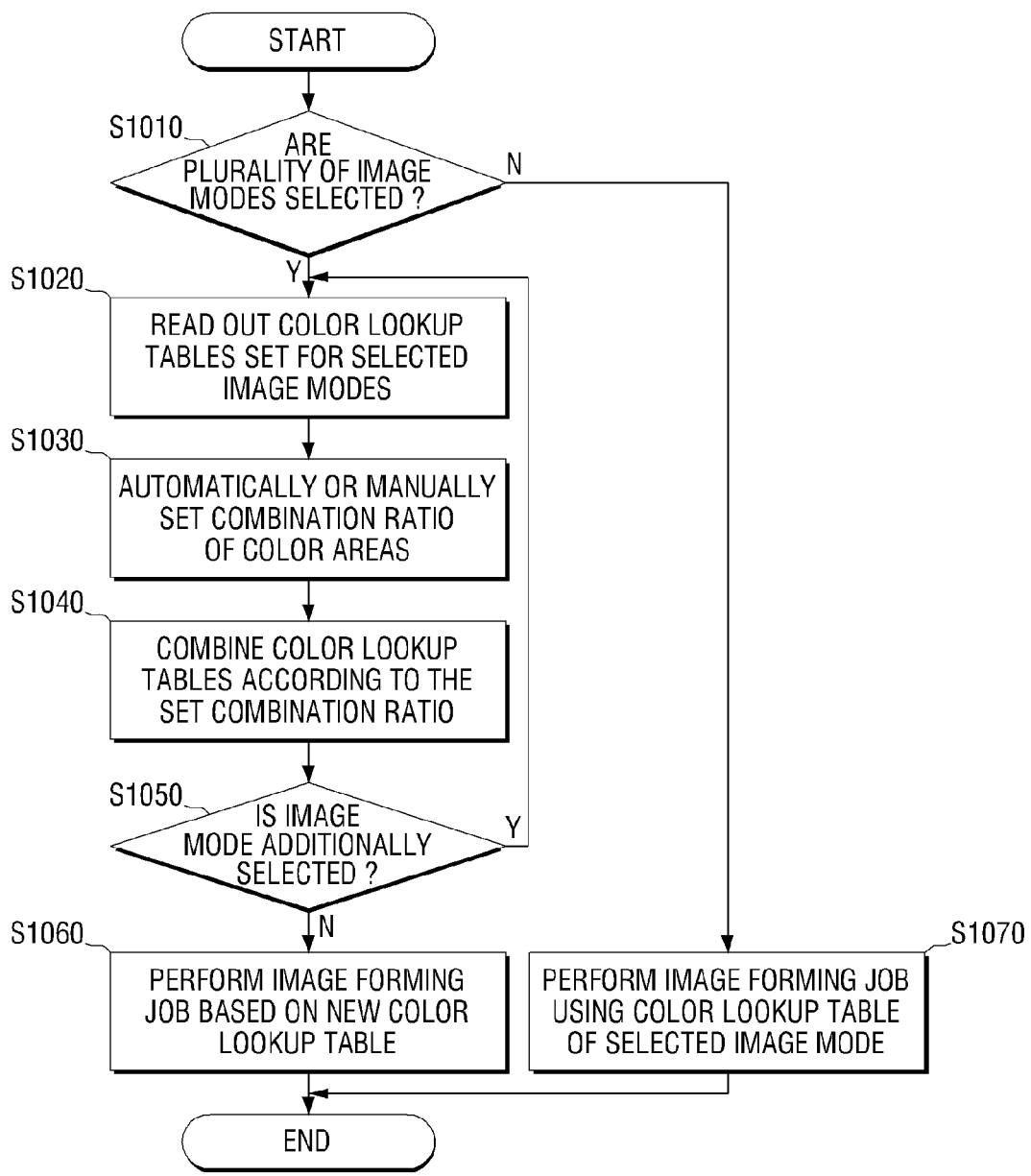
FIG. 10 is flowchart explaining in detail an image forming method according to an exemplary embodiment of the present general inventive concept.

FIG. 10 is flowchart explaining in detail the image forming method of FIG. 9. In FIG. 10, if a plurality of image modes are selected in operation S1010: Y, a plurality of color lookup tables respectively set for the plurality of selected image modes are read out in operation S1020. Accordingly, a combination ratio of color areas in each of the plurality of read color lookup tables is set automatically or manually in operation S1030. The process of setting the combination ratio has been described above in detail, so no further description thereof is herein provided.

Subsequently, the plurality of color lookup tables are combined according to the set combination ratio to obtain a new color lookup table in operation S1040. After combination of the plurality of color lookup tables, whether or not an image mode is additionally selected is determined in operation S1050. As a result of operation S1050, if it is determined that there is no additional image mode, an image forming job is performed based on the new color lookup table in operation S1060. Alternatively, if it is determined that an image mode is additionally selected, the new color lookup table is again combined with a color lookup table of the additional image mode, so that a final color lookup table is selected.

For example, if three or more image modes are selected, the three or more selected image modes may continue to be combined sequentially, i.e., first two modes are combined, then the combination and the third mode are combined, etc. The three or more selected image modes may be combined simultaneously with an expansion of the equations shown for the new color lookup table of Equation 2. Alternatively, respective color areas in the three or more selected image modes are connected by a plurality of connection lines and displayed on a screen, and a plurality of gauges are placed on each of the connection lines so that a user may set the combination ratio at once.

If a single image mode is selected in operation S1010: N, an image forming job is performed using only a color lookup table of the selected image mode in operation S1070.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As described above, according to the present general inventive concept, a user may optionally set an image mode and create a new color lookup table. Accordingly, it is possible to support various image modes without the need to include a memory.

In the embodiments of the present general inventive concept, there is no need for a user to manually select a plurality of image modes.

In more detail, since users prefer different colors according to various conditions such as their region, race or gender, the image forming apparatus may support a custom color mode which enables users to set their desired custom colors. In this situation, if a user selects the custom color mode, a default mode to use a color lookup table representing basic colors and the custom color mode to use a color lookup table in which a desired custom color is emphasized may be set to A mode and B mode, respectively, or vice versa. Subsequently, when the user sets a combination ratio of the colors, a ratio of the custom color to the basic colors may be changed according to the set combination ratio. As a result, the user may optionally adjust how much custom color is added.

Additionally, when a user selects the combination ratio automatic setting mode, the default mode and the text mode may automatically be selected.

In the embodiments of the present general inventive concept, the new color lookup table created by the user may be removed or stored in the storage unit 130. Accordingly, the user may optionally create a desired image mode, store the created image mode and continue to use his or her own image mode.

Additionally, one or more image modes that have been created by the user may be displayed on the screen 10 of FIG. 3, and thus it is possible for the user to easily select a desired image mode from among the one or more image modes and to use or re-edit the selected image mode.

Although various exemplary embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus comprising:
   a user interface to receive a user input to select a value for a combination mode, the value being selectable between a first value for a non-text mode and a second value for a text mode; and
   an image forming unit to perform a printing operation to print an image on a print medium according to the value for the combination mode,
   wherein the first value is associated with a first group of color values for printing of non-text image in the non-text mode, and the second value is associated with a second group of color values for printing of text in the text mode,
   wherein one or more color values in the first group are different from one or more corresponding color values in the second group, respectively.

2. The image forming apparatus of claim 1, further comprising:
   a storage unit to store information regarding a non-text mode, a text mode, and a plurality of color lookup tables respectively set for the non-text mode and the text mode.

3. The image forming apparatus of claim 2, wherein the image forming unit comprises:
   a controller to combine color lookup tables of the non-text mode and the text mode and to create a new color lookup table; and
   an engine unit to perform the image forming job in an image mode corresponding to the new color lookup table created by the controller.

4. The image forming apparatus of claim 3, wherein, when the non-text mode and text mode are selected, the user interface arranges a plurality of color areas comprising the color lookup tables of the non-text mode and text mode, and displays a ratio adjustment field to set combination ratios of the non-text mode and text mode in each of the plurality of color areas.

5. The image forming apparatus of claim 4, wherein the ratio adjustment field comprises a plurality of connection lines to connect the non-text mode and the text mode for each color area, and a plurality of gauges to move on the plurality of connection lines according to user control.

6. The image forming apparatus of claim 5, wherein one image mode among the non-text mode and the text mode is matched to one end of each of the plurality of the connection lines, and another image mode is matched to the opposite end, and
   wherein a combination ratio of the two image modes matched to both ends of each of the connection lines is set according to a distance ratio between each of the plurality of gauges and both ends.

7. The image forming apparatus of claim 4, wherein the user interface displays a selection field through which each of the plurality of color areas is capable of being selected, and the controller combines data on one or more color areas selected through the selection field from data on the color lookup tables of the two or more selected image modes, and creates the new color lookup table.

8. The image forming apparatus of claim 3, wherein the storage unit matches information regarding the new image mode to information regarding the new color lookup table and stores the matched information.

9. The image forming apparatus of claim 8, wherein the user interface displays a list of the plurality of new image modes stored in the storage unit so that the plurality of new image modes are selected from the list.

10. The image forming apparatus of claim 3, wherein the image forming unit further comprises:
a ratio setting unit to automatically set a combination ratio of the color lookup tables of the non-text mode and text mode and to provide the set combination ratio to the controller.

11. The image forming apparatus of claim 10, wherein the ratio setting unit automatically sets a combination ratio of gray area data in each of the color lookup tables of non-text mode and text mode according to a ratio of a gray value to a color value of an object for the image forming job.

12. The image forming apparatus of claim 11, wherein the user interface displays a preview image for the new image mode.

13. A method to form an image on an image forming apparatus, comprising:
receiving a user input to select a value for a combination mode, the value being selectable between a first value for a non-text mode and a second value for a text mode; and
performing a printing operation to print an image on a print medium according to the value for the combination mode,
wherein the first value is associated with a first group of color values for printing of non-text image in the non-text mode, and the second value is associated with a second group of color values for printing of text in the text mode,
wherein one or more color values in the first group are different from one or more corresponding color values in the second group, respectively.

14. The method of claim 13, wherein the performing of the image forming job comprises:
combining color lookup tables of the non-text mode and the text mode and creating a new color lookup table; and
performing the image forming job in an image mode corresponding to the new color lookup table.

15. The method of claim 14, further comprising:
when the non-text mode and the text mode are selected, displaying a plurality of color areas comprising the color lookup tables of the non-text mode and the text mode, and a screen comprising a ratio adjustment field to set combination ratios of the non-text mode and text mode in each of the plurality of color areas.

16. The method of claim 15, wherein the ratio adjustment field comprises a plurality of connection lines to connect the non-text mode and the text mode for each color area, and a plurality of gauges to move on the plurality of connection lines according to user control.

17. The method of claim 16, wherein:
one image mode among the non-text mode and the text mode is matched to one end of each of the plurality of the connection line, and another image mode is matched to the opposite end; and
a combination ratio of the two image modes matched to both ends of each of the connection lines is set according to a distance ratio between each of the plurality of gauges and both ends.

18. The method of claim 15, wherein the screen comprises a selection field through which each of the plurality of color areas is capable of being selected.

19. The method of claim 18, wherein the creating of the new color lookup table comprises combining data on one or more color areas selected through the selection field from data on the color lookup tables of the two or more selected image modes, and creating the new color lookup table.

20. The method of claim 14, further comprising:
matching information regarding the new image mode to information regarding the new color lookup table and storing the matched information.

21. The method of claim 20, further comprising:
displaying a list of the plurality of new image modes so that the plurality of image modes are selected from the list.

22. The method of claim 14, wherein the creating of the new color lookup table comprises automatically setting a combination ratio of the color lookup tables of the non-text mode and text mode and combining the color lookup tables at the set combination ratio.

23. The method of claim 14, wherein the creating of the new color lookup table comprises automatically setting a combination ratio of gray area data in each of the color lookup tables of the non-text mode and text mode according to a ratio of a gray value to a color value of an object for the image forming job.

24. The method of claim 23, further comprising:
displaying a preview image for the new image mode.

25. A non-transitory computer readable medium to a program to perform a method to form an image in an image forming apparatus, the method comprising:
receiving a user input to select a value for a combination mode, the value being selectable between a first value for a non-text mode and a second value for a text mode; and
performing a printing operation to print an image on a print medium according to the value for the combination mode,
wherein the first value is associated with a first group of color values for printing of non-text image in the non-text mode, and the second value is associated with a second group of color values for printing of text in the text mode,
wherein one or more color values in the first group are different from one or more corresponding color values in the second group, respectively.

* * * * *